Figure 1:
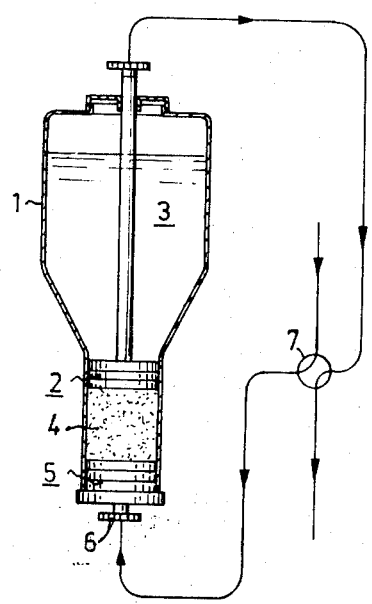

United States Patent [19]

Falksveden, Lars-Gunnar Albinsson

[11] 3,869,436

[45] Mar. 4, 1975

[54] METHOD FOR FRACTIONATING PLASMA PROTEINS USING PEG AND ION-EXCHANGERS

[75] Inventor: Falksveden, Lars-Gunnar Albinsson, Stockholm, Sweden

[73] Assignee: Statens Bakteriologiska Laboratorium, Solna, Sweden

[22] Filed: Oct. 5, 1973

[21] Appl. No.: 403,839

Related U.S. Application Data

[63] Continuation of Ser. No. 148,541, June 1, 1971, abandoned.

[52] U.S. Cl............... 260/112 B, 424/101, 424/177
[51] Int. Cl............................................. C07g 7/00
[58] Field of Search................. 424/177; 260/112 B

[56] References Cited
UNITED STATES PATENTS

| | | | |
|---|---|---|---|
| 2,469,193 | 5/1949 | Cohn............................. | 260/112 B |
| 2,520,076 | 8/1950 | Williams et al. ............... | 260/112 B |
| 2,543,215 | 2/1951 | Williams et al. ............... | 260/112 B |
| 2,669,559 | 2/1954 | Reid.............................. | 260/112 B |
| 2,710,294 | 6/1955 | Gerlough....................... | 260/112 B |
| 3,234,199 | 2/1966 | Reid.............................. | 260/112 B |
| 3,238,192 | 3/1966 | Taylor........................... | 260/112 B |
| 3,415,804 | 12/1968 | Polson........................... | 260/112 B |
| 3,597,409 | 8/1971 | Brever........................... | 260/112 B |
| 3,631,018 | 12/1971 | Shanbrom et al. ............. | 260/112 B |
| 3,652,530 | 3/1972 | Johnson et al.................. | 260/112 B |

OTHER PUBLICATIONS

Chem. Abstracts, Vol. 57, 1962, 10427g-h, Kakowska et al.
Chem. Abstracts, Vol. 67, 1967, 9782x, Chun et al.
Chem. Abstracts, Vol. 67, 1967, 89221b, Kwon et al. and 89222c, Enikeeva et al.

*Primary Examiner*—Howard E. Schain
*Attorney, Agent, or Firm*—Salter & Michaelson

[57] ABSTRACT

The present invention relates to a method for fractionating plasma proteins for preparing, inter alia, immune serum globulin and albumin. The method is characterized by the following steps:

a. removing blood corpuscles and cell fragments from the plasma in the blood;
b. precipitating the globulins in the plasma with polyethylene glycol in a concentration of 10 to 15 % by weight and at a pH of 6.5 to 8.0, preferably 7.0;
c. centrifuging out all of the precipitate and possibly extracting albumin out of the remaining solution;
d. dissolving the precipitate at pH 5.8 in 0.05 sodium acetateacetic acid buffer and centrifuging out undissolved fibrinogen and IgM;
e. adsorbing the globulins on a cation exchanger, preferably carboxy methyl dextran, pH 5.8, and eluting with 0.2 sodium chloride in 0.05 phosphate buffer at pH 7.5 to 8.0, preferably 7.8;
f. precipitating with polyethylene glycol at pH 6.5 to 8.0, preferably 7.0, centrifuging and dissolving the precipitate in 0.2 M phosphate buffer at pH 6.6;
g. adsorbing all the globulins excluding IgG on an anion exchanger, preferably diethyl aminoethyl dextran, pH 6.6;
h. cooling the IgG solution to −0.3°C and precipitating IgG with ethanol in a 25 % by volume concentration at −5° to −10°C, preferably −7°C;
i. separating the precipitate, suspending and washing with 25 % by volume ethanol at pH 7.0 at −5° to −10°C, preferably −7°C, and then renewed centrifuging;
j. dissolving in glycine and sterile-filtering;
k. freeze-drying and preparing a 16 to 16.5 % IgG solution in 0.3 glycine for injection.

5 Claims, 6 Drawing Figures

PATENTED MAR 4 1975  3,869,436

INVENTOR.
LARS-GUNNAR ALBINSSON FALKSVEDEN
BY Salter & Michaelson

METHOD FOR FRACTIONATING PLASMA PROTEINS USING PEG AND ION-EXCHANGERS

This is a continuation of application Ser. No. 148,541, filed June 1, 1971, now abandoned.

The present invention relates to the fractionating of plasma proteins for preparing, inter alia, immune serum globulin and albumin.

Blood consists of suspended solid blood corpuscles in plasma. The blood corpuscles make up about 45 % of the total volume while the rest, the so-called blood plasma, is constituted of about 90 % water, 9 % protein, 0.9 % salts and lesser amounts of organic compounds.

Blood plasma proteins are found in a large number of widely separated functions such as enzymes, antibodies or the controlling water-salt balance in organisms.

Both whole blood and blood plasma are often used in treating different stages of illnesses. However, it has long been evident that many of the proteins administered when combating a sickness are not at all necessary. On the contrary, they are more likely in certain cases to cause harm. Therefore, in order to be able to clinically utilize the active components in the best possible way, they must be isolated and enriched.

Raw material for the production of albumin and immune serum globulin preparation is basically obtained by collecting retroplacental blood from maternity wards in hospitals and excess blood and plasma for preparing immune serum globulin solutions having an increased amount of antibodies directed against specific sicknesses is obtained by inoculating blood donors with well defined antigenes. Convalescence blood is used as raw material for the same purpose. As a rule, the cost of these so-called specific immune serum globuline is high. The raw material obtained for fractionating the antigen depends on the collecting method used and will be either whole blood, plasma or serum. Blood is often drawn from an immunized blood donor by employing the so-called plasmapheres method whereby the blood, when being drawn, is mixed with a dextrose sodium citrate-citric acid buffer which prevents the blood from coagulating. The blood corpuscles can be separated from the plasma by centrifuging and reinjection into the blood donor. In this way, the plasma obtained can also be injected directly, but also constitutes the raw material for additional fractionation.

Many attempts have been made to discover a process which makes possible the isolation of clinically important plasma proteins without loss or lessening of the biological activity. What is sought is a method of fractionating whereby the isolated proteins retain their same physiological properties as in the blood.

The oldest method employed for precipitating plasma proteins is the use of neutral salts, especially ammonium sulfate. The salting out process is a system comprising four variables: salt concentration, protein concentration, pH and temperature. Included in the salt precipitation are large amounts of neutral salts which must be removed by dialysis. The procedure is known for giving a high yield and has been described by Schultze H.E. et al. Behringwerk-Mitteilungen, No. 22, 1954. A method is used in England which includes, inter alia, ether as a precipitant (Kekwik R.A. et al. Med. Research Council Spc. Report Series No. 286, London, Her Majesty's Stationary Office 1954). Reid's ion exchange method (Reid A.F. et al. Ind. Eng. Chem. 43, 1974, 1951) may also be mentioned, as can Cohn's alcohol method. The latter is by far the most popular method and has gained wide acceptance. It is described, inter alia, in J. Am. Chem. Soc. 68(1946) 459 and 72(1950) 465, (Cohn et al.) and 71(1949) 541, (Oucley), and in the U.S. Pat. Nos. 2,390,074, 2,437,060 and 2,543,215 as well as e.g. in the Swedish patent specification No. 136,401. In the process worked out by Cohn et al. at the beginning of the 1940's, ethanol is used as a precipitant. By varying the concentration of the ethanol at low ion strength and low temperatures, the plasma proteins are subdivided into five main fractions. If ethanol is replaced by other organic solvents, e.g. ether or acetone, the possibilities are further increased of finding suitable precipitation conditions for the separation of complex protein mixtures. The advantage of using ethanol or other organic solvents instead of neutral salts is that their volatility allows them to be easily removed by means of freeze-vacuum drying.

A drawback with Cohn's alcohol precipitation system is that the different precipitating stages must occur at low temperatures to avoid denaturing of the proteins. Therefore, the plasma solution must be cooled down to 0°C before the alcohol is added, and this temperature must not be exceeded during any of the fractionating steps. Despite the numerous advantages of the Cohn method, it has been shown that proteins isolated with alcohol as a precipitant cause albumin and immune serum globulin aggregates. Several of the proteins important for clinical use lose their original properties when in repeated contact with alcohol and occur in irreversibly aggregated and denatured form in the immune serum globulin. Thus, the immune serum globulin aggregate obtains a sedimentation constant of 9.5 to 10.1 S. But many commercially available products contain up to 25 % of such protein.

The present classification system of immune serum globulins is based on Bull, World Health Organization 30(1964) page 447 where they are classified with symbols representing the main class and pertinent polypeptide chains. $\gamma$ or Ig have been selected as suitable symbols for immune serum globulin. The symbol used is followed by a capital letter representing the main class, e.g. $\gamma G$, $\gamma M$ or IgG, IgM. This terminology has been used throughout the present application.

The injected aggregate immune serum globulin is secreted considerably faster than unaggregated material with the sedimentation constant 7 S. Remaining plasmin in the IgG-fraction after purification causes fragmentation of the antibody due to its protolytic activity. This also implies a more rapid removal. Both these factors substantially influence the clinical result when treating with the material.

Figure 2:
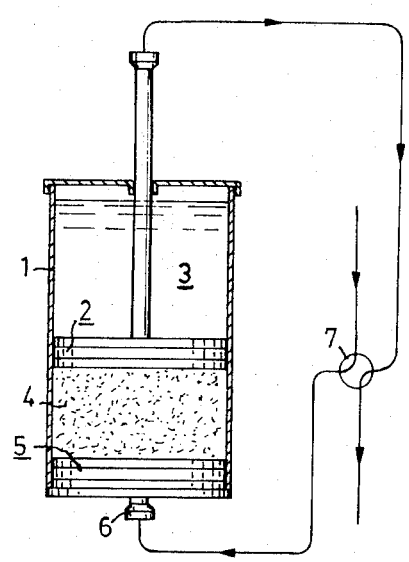

The invention will be further described below with reference to the drawings where FIG. 1 shows an ion exchange column according to the invention; FIG. 2 shows another embodiment of the ion exchange column and FIGS. 3 to 6 show absorption curves for various preparations.

In a method according to the invention whereby the dissimilar charging properties of the plasma proteins are utilized together with their solubility in a system where ion exchange chromatography is used interchangeably with precipitation-dissolving, an aggregate-free IgG is obtained, with a high yield, as a final product.

A distinct advantage with the new procedure is that rough fractionating and final purification of separated components can be effected at room temperature under aseptic conditions. Only the concluding work after isolation requires temperatures below 0°C. The fractionated material can be examined with the help of ultracentrifugation or another suitable form of gel filtration.

Subdivision of plasma proteins into a plurality of rough fractions is carried out as follows. Firstly, the globulins are precipitated at a neutral pH by the addition of polyethylene glycol under such conditions that the albumin fraction remains in the solution. Thus 13 % of the polyethylene glycol in the reaction-mixture precipitates all the globuline at a temperature of 15°-25°C and pH 7 without the albumin being affected.

The polyethylene glycol used as a precipitant has an average molecular weight of 6000 (Union Carbide, USP grade, USA). Such precipitations are described in the British patent specification No. 1,006,258.

The precipitation with polyethylene glycol is affected not only by the polyethylene glycol concentration, but also by ion strength, protein concentration, temperature and pH with pH changes having the greatest effect. In contrast with ethanol, polyethylene glycol has a protein stabilizing effect at room temperature.

The precipitate obtained is separated, preferably by centrifugation, and is extracted so that the IgG fraction is dissolved, positively charged, whereas IgM, fibrinogen and plasminogen remain undissolved. Used for the solution is e.g. sodium acetate-acetic acid buffer at pH 5.8. Undissolved precipitate is separated by centrifugation and the solution is treated with a cation exchanger at pH 5.8.

The cation exchanger used is preferably carboxy methyl dextran (Sephadex CM 50). The treatment with the ion exchanger can take place either batchwise or in column. In order to be able to utilize the advantages with both these methods, the batchwise treatment's rapid bonding of protein from larger volumes and the simpler elution process in the column, a special technique and apparatus have been developed. A protein solution and an ion exchange gel are agitated in a pyriform container 1 (FIG. 1, sealed at the bottom with a filter-provided plug) until equilibrium is attained. When the agitation is stopped, a gel column of the ion exchanger is formed in the lower part of the container. The column is separated at the top with a filter-provided expansion plug 2 which is controllable by a rod 3 and is shaped so that it can be conducted down through the uncombined protein layer to the upper edge of the gel column where it constitutes a tight seal between the gel and the uncombined protein solution. The filter-provided expansion plugs, 5 and 2, are connected via tubes with a four-way cock 7. In this way, solutions can be circulated and conducted to and from the column 4 in different ways and from various containers, e.g. with elution from below, washing from above, etc. A similar apparatus having a cylindrical container instead of a pyriform one is shown in FIG. 2.

Remaining in the solution after the cation exchange treatment are, inter alia, $\beta$-lipoproteins, $\alpha$-macroglobulins, lipids, remainders of precipitated albumin and a lesser amount of IgG.

The elution of the ion exchanger occurs later with an eluting buffer having a higher pH or by increasing the ion strength. As is evident from the figure, the apparatus is so designed that the elution can take place either downstream or upstream. The latter is essential, particularly when the eluent has a higher density than the eluted protein solution.

The eluent used is a sodium chloride solution buffered with sodium phosphate.

With renewed precipitation of the eluate by polyethylene glycol, precipitation of all the globulins is obtained with the exception of a lesser quantity of transferrin. The precipitate is centrifuged and redissolved in a phosphate buffer at pH 6.6. It is then centrifuged until no precipitate remains and agitated with ion exchanger. All the remaining proteins, with the exception of IgG, are then bonded at the ion exchanger used, diethyl aminoethyl dextran (Sephadex DEAE A 50). The IgG solution is subsequently cooled to −0.3°C and cooled ethanol is added to a 25 % concentration during a lowering of the temperature to −7.0°C at which point the IgG is completely precipitated from the solution. The precipitate is separated by centrifugation, suspended in 25 %, cooled ethanol and washed at −7.0°C. The thereby washed precipitate is dissolved in an ice-cooled glycine solution and sterile-filtered. After freeze-drying, a 16-16.5 % IgG solution is prepared in 0.3 M glycine.

By using the method according to the invention, rapid fractionating is obtained under room-temperature and aseptic conditions. The method can be employed in laboratories and on an industrial scale and allows for a large number of separation possibilities. The reproductiveness of the method is also quite good, independent of the size of the starting volume. The dilution of the liquid is small and the fractionating volume is less than 150 % of the starting volume. The ion exchange capacity is maximally utilized.

EXAMPLE

Isolating immune serum globulin (IgG) from human plasma.

The human plasma is kept frozen at −20° C, is then thawed out at +4.0°C and centrifuged to separate an undissolved residue of fibrinogen, cell fragments and blood corpuscles. The AHF factor is recovered from this undissolved residue.

One part by volume of centrifuged, clear solution is precipitated at a temperature of 15°-25°C with one-half part by volume of 39 % polyethylene glycol solution in 0.05-M sodium citrate solution adjusted to pH 7.0 with citric acid.

The final concentration of 13 % polyethylene glycol in the reaction mixture precipitates practically all the globulins which are separated by centrifugation for 10 minutes at 300 × g. The solution kept from the centrifugation essentially contains albumin which is recovered.

The precipitate removed by centrifugation is dissolved in one part by volume of 0.05 M sodium acetate buffer with pH 5.8, the proteins being dissolved with the exception of fibrinogen, IgM and plasminogen. These are removed by centrifugation at 1500 × g for 15 minutes. The remaining, clear globulin solution is agitated for 40 minutes at room temperature in the pyriform container with the cation exchanger (Sephadex CM 50) in equilibrium with 0.05 M sodium acetate buffer, pH 5.8 and in an amount of raw plasma corresponding to 6 g dry ion exchanger per kg.

The ion exchanger with the bonded protein is allowed to settle and is separated by the filter-provided expansion plug 2 from the uncombined protein. The bonded protein is then eluted upstream with 0.05 M sodium phosphate buffer containing 0.2 M sodium chloride, pH 7.8. The eluted globulin has a pH of about 7. After dilution with aq. dest. to one part by volume (the starting volume), the solution is again precipitated with 39 % polyethylene glycol solution in 0.05 M sodium phosphate buffer, pH 7.0, with a final concentration of 13 % PEG. Thus, all the globulins are precipitated, excluding a lesser amount of transferrin.

The globulin precipitate is centrifuged for 10 minutes at 300 × g and is dissolved in one part by volume of 0.02 M sodium phosphate buffer with pH 6.6. The dissolved precipitate is centrifuged for 10 minutes at 300 × g and agitated at room temperature for 20 minutes with the anion exchanger (Sephadex DEAE A 50) in an amount of raw plasma corresponding to 6 g dry ion exchanger per kg, and in equilibrium with 0.02 M sodium phosphate buffer with pH 6.6. In this way, all the remaining proteins, with the exception of IgG, are bonded at the ion exchanger. The uncombined IgG solution is then cooled to −0.3°C and mixed with, during continuous temperature lowering and vigorous agitation during temperature controlled supply, cooled 75 % ethanol in such a manner that the heat from the solution is quickly distributed and removed. At a final concentration of 25 % ethanol and at −7°C, the immune serum globulin is completely precipitated from the solution. The precipitate is removed by centrifugation at −10°C for 15 minutes and 1500 × g, suspended in one-sixth part by volume of 25 % ethanol in 0.005 M sodium phosphate buffer, pH 7.0, at −7°C and recentrifuged.

The precipitate washed in this way is dissolved in one-twentieth part by volume of ice cooled 0.1 M glycine solution sterile-filtered through an asbestos filter, frozen and freeze-dried.

After freeze-drying, a 16–16.5 % immune serum globulin solution can be prepared in 0.3 M glycine for clinical use.

The immune serum globulin obtained is aggregate-free, has uniform molecular weight and has maintained antigen-neutralizing properties. Pyrogenic material, if any, in the raw material is removed by the purification process. The same applies to au-antigen (au - Australian antigen - protein which is found in the blood of persons infected with the hepatic virus). The yield is high and the globulin is stable.

Since the material precipitated out or bonded to an ion exchanger always contains precipitated or uncombined material, the concluding purification is effected according to the method so that the isolated material is found in the supernatant during precipitation and in the uncombined material after treatment with the ion exchanger. By bonding that portion of the component mixture which has the lowest concentration, the capacity of the ion exchanger can be maximally utilized relative to the total amount of the components present.

For the examination of the products, gel-filtering curves have been drawn up for preparations prepared according to different methods. Test solutions of about 16 % IgG have been gel-filtered through agarose columns (Biogel 1.5 A) in columns (8 × 750 mm) in 0.1 M Tris-HCl-buffer, pH 8.0, with 0.5 M NaCl and 2 % n-butanol with a 50 ul sample added and was measured at 280 and 260 nm in a flow through cuvette with a 1 mm layer thickness.

The curve line for the 280 nm is continuous and the curve line for the 260 nm is broken.

Figure 3:
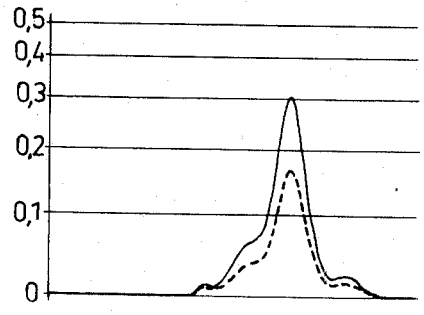
Figure 4:
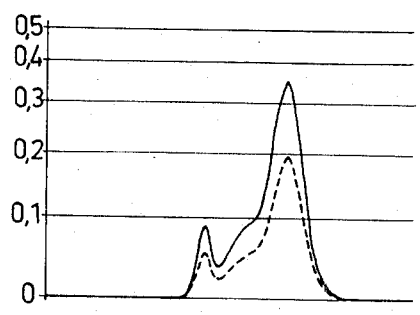
Figure 5:
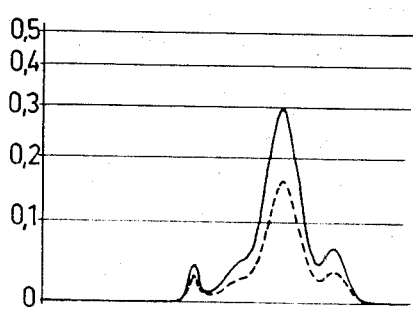
Figure 6:
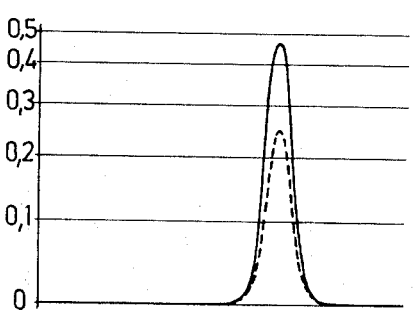

FIG. 3 shows the absorption curve for IgG prepared according to the Schultze ammonium sulphate method. FIGS. 4 and 5 show absorption curves for IgG prepared according to variations of the Cohn method. FIG. 6 shows an absorption curve for an IgG preparation prepared according to the present invention. These curves illustrate how the aggregate formed — the first peak on the curves in FIGS. 3, 4 and 5 — is missing in FIG. 6 and that the breaking down due to incomplete separation of the plasmin has completely disappeared — the final peak on the curves in FIGS. 3, 4 and 5 — in FIG. 6. The symmetry on the absorption curve for the preparation according to the invention shows the uniform molecular distribution in this material.

What is claimed is:

1. A method of fractionating plasma proteins, comprising the following steps:
   a. removing blood corpuscles and cell fragments from the plasma in the blood;
   b. precipitating the globulins in the plasma with polyethylene glycol having a molecular weight of approximately 6000 in a concentration of 10 to 15% by weight and at a pH of 6.5 to 8.0 at room temperature;
   c. centrifuging out all of the precipitate from the remaining solution;
   d. dissolving the precipitate at pH 5.8 in 0.05 M sodium acetate-acetic acid buffer and centrifuging out undissolved fibrinogen, plasminogen and IgM;
   e. adsorbing the globulins from the solution containing β-lipoproteins, α-macroglobulins, lipids, precipitated albumin and IgG obtained in step (d) on carboxy methyl dextran cation exchanger at a pH of 5.8, thereby leaving in the solution the β-lipoproteins, α-macroglobulins, lipids, precipitated albumin and a lesser amount of IgG; and eluting the cation exchanger with 0.2 M sodium chloride in 0.05 M phosphate buffer at pH 7.5 to 8.0 to obtain the adsorbed globulins including IgG;
   f. precipitating the eluate from step (e) with additional polyethylene glycol at pH 6.5 to 8.0, centrifuging and dissolving the precipitate in 0.2 M phosphate buffer at pH 6.6;
   g. adsorbing all the globulins in the solution from step (f) excluding IgG on an anion exchanger at pH 6.6;
   h. cooling the IgG solution to −0.3°C. and precipitating IgG with ethanol in a concentration of 25% by volume of the total system at −5° to −10°C, said use of ethanol being the first use of ethanol in said process;
   i. separating the precipitate, suspending and washing with 25% by volume ethanol at pH 7.0 at −5° to −10°C., and then renewing centrifuging;
   j. dissolving in 0.1 M glycine and sterile-filtering; and
   k. freeze-drying and preparing at 16 to 16.5% IgG solution in 0.3 M glycine for injection.

2. Method according to claim 1, characterized in that the precipitation of the globulins in the plasma — step (b) — is effected with a polyethylene glycol concentration of 13 % by weight.

3. Method according to claim 1, characterized in that the temperature during precipitation with polyethylene glycol — step (b) — is kept at 10°–25°C.

4. Method according to claim 1 wherein the pH in step (b) is 7.0 and the temperature is 15°–18°C.; wherein the albumin is extracted in step (c); wherein the pH of the eluting solution in step (e) is 7.8; wherein the pH in step (f) is 7.0; wherein the anion exchanger in step (g) is diethyl aminoethyl dextran; wherein the precipitating in step (h) is at −7°C.; and wherein the washing in step (i) is at −7°C.

5. In a method of fractionating plasma proteins comprising:
   a. removing blood corpuscles and cell fragments from the plasma in the blood;
   b. precipitating the globulins in the plasma with a 10-15% by weight polyethylene glycol solution at room temperature and a pH of 6.5 to 8.0;
   c. centrifuging out all of the precipitate from the remaining solution;
   d. extracting the precipitate by dissolving the IgG fraction while leaving fibrogen, plasminogen and IgM undissolved, and centrifuging out said undissolved fibrogen, plasminogen and IgM;
   e. fractionating the globulins to obtain an IgG rich fraction;
   f. precipitating the IgG rich fraction from step (e) with polyethylene glycol at a pH of 6.5 to 8.0, centrifuging and dissolving the precipitate in a phosphate buffer;
   g. adsorbing all the globulins in the solution from step (f) excluding IgG on an anion exchanger;
   h. cooling the IgG solution to below zero degrees Centigrade and precipitating IgG with 25% ethanol at a temperature of −5° to −10°C.;
   i. separating and washing said precipitate at a temperature of −5° to −10°C., and then renewing centrifuging;
   j. dissolving in glycine and sterile-filtering; and
   k. freeze-drying; the improved process wherein:
   said fractionating step (e) comprises adsorbing the globulins from the solution containing β-lipoproteins, α-macroglobulins, lipids, precipitated albumin and IgG obtained in step (d) on carboxy methyl dextran at pH 5.8 and eluting with 0.2 M sodium chloride in 0.05 M phosphate buffer at a pH of 7.5 to 8.0 to obtain the adsorbed globulins including IgG;
   said polyethylene glycol in step (f) is additional polyethylene glycol; and
   said ethanol in step (h) is the first usage of ethanol in said method.

* * * * *